United States Patent [19]
Steward

[11] 3,866,560
[45] Feb. 18, 1975

[54] EMERGENCY PLUG FOR SEALING OPENINGS

[75] Inventor: John Steward, Vancouver, B.C., Canada

[73] Assignee: Raymond Lee Organization, Inc., New York, N.Y. ; a part interest

[22] Filed: Aug. 29, 1973

[21] Appl. No.: 392,454

[52] U.S. Cl............................. 114/227, 220/24.5
[51] Int. Cl............................................ B63b 43/16
[58] Field of Search.................. 114/227, 228, 229; 220/85 B, 24.5; 138/93, 89

[56] References Cited
UNITED STATES PATENTS

| | | | |
|---|---|---|---|
| 724,279 | 3/1903 | Goldstein | 9/324 |
| 1,301,204 | 4/1919 | Warner et al. | 114/227 |
| 2,474,047 | 6/1949 | Gorzkowski | 138/93 |
| 3,173,162 | 3/1965 | Elder | 9/317 |

FOREIGN PATENTS OR APPLICATIONS

| | | | |
|---|---|---|---|
| 247,381 | 2/1926 | Great Britain | 114/227 |
| 320 | 0/1896 | Great Britain | 114/227 |
| 563,977 | 9/1944 | Great Britain | 114/227 |

Primary Examiner—Harry N. Haroian

[57] ABSTRACT

A device for sealing a hole or orifice to prevent ingress of liquid, vapor or gas by employing material expanded by release of gas therein to expand both inside and outside the hole or orifice. This produces an equal pressure envelope which seals both inner and outer surfaces by proximity adhesion.

5 Claims, 5 Drawing Figures

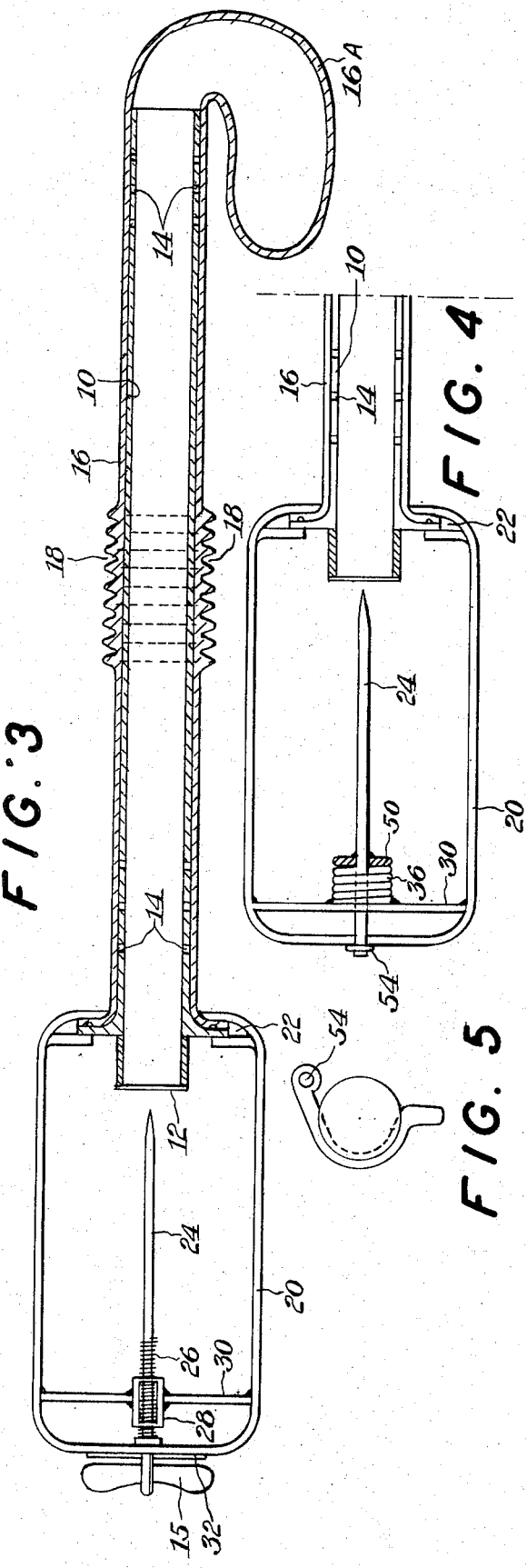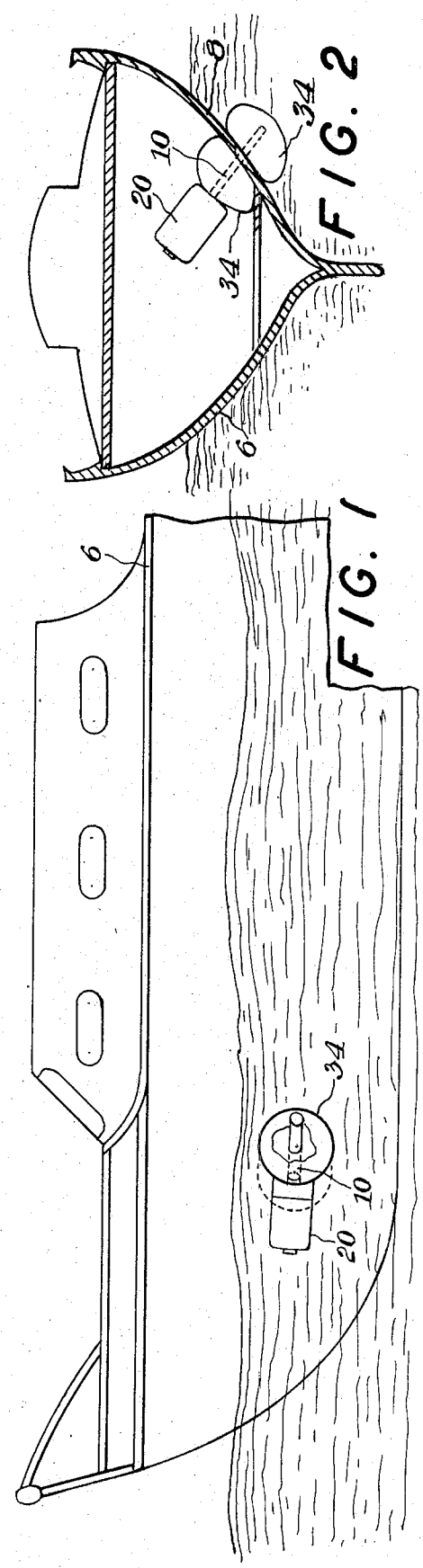

EMERGENCY PLUG FOR SEALING OPENINGS

SUMMARY OF THE INVENTION

My invention, which I call SAFE PLUG, is a device designed to be employed as an emergency plug for use in blocking any hole or orifice from the ingress of water, vapours, gases and air.

The device is readily employed to be inserted into the hole or orifice, inflating by immediate release of pressure tank causing the expanding material to expand both inside and outside of the hole or orifice, causing an equal pressure envelope to occur which by virtue of inflation pressure seals both the inner surface and outer surface by proximity adhesion.

The invention can be used for the safeguarding of life and property at sea or in any environment wherein the medium is liquid and can be used for sealing aircraft vents occurring through window failure and many associated uses. The basic construction consists of a pressurized tank connected with a sealed acrylic rod perforated at its extremities and being hollow in design, surrounded by tough resilient sheath of expandable material such as neoprene, rubber or latex, with the center portion longitudinally reinforced by corrugated design, which corrugation is generally in contact with the broken or severed surfaces of the hole or orifice. The SAFE-PLUG can be manufactured in all longitudinal lengths, subject only to the increased pressure, vessel capacity for the increased lengths, thus accommodating all sizes of hull thickness or fuselage thicknesses. A needle ruptures the rod and allows the pressure in the tank to inflate the sheath.

The SAFE-PLUG is immediate in its effectiveness and can be used by the simplest form of application by insertion from the safety of the inner surfaces of the medium in which it has to penetrate.

Under matters of marine salvage, the SAFEPLUG can be utilized in all areas wherein attachment to the hull of a submerged vessel can be done by insertion of the SAFE PLUG. Port holes, anchor holes and all other openings can be utilized. Upon inflation, the inner and outer envelopes are self-trapping and the inner envelope will dispel through inflated volume of equal water volume and at the same time create a bouyancy factor, which will increase chances of eventual salvage.

Plexi-glass, fibreglass, ferro-concrete, wooden and balsa vessels are all capable of being kept afloat when foreign objects, i.e. deadheads, marine animals, coral reef rock or other under-water hazards cause holing, by the quick and effective insertion of the SAFE PLUG.

BRIEF DESCRIPTION OF THE DRAWINGS

In the drawings:
FIG. 1 is a side view of the invention in use;
FIG. 2 is a cut away end view thereof;
FIG. 3 is a side cross section of one embodiment of my invention;
FIG. 4 is a detail cross section of a modification of the structure of FIG. 3; and
FIG. 5 is a detail view of another part of the structure of FIG. 4.

DETAILED DESCRIPTION OF PREFERRED EMBODIMENTS

Referring first to FIGS. 1-3, should a vessel 6 develop a hole through which water would otherwise enter and possibly cause the vessel to sink, my invention can be used to seal the hole and prevent water entry.

To this end, an elongated hollow acrylic tube 10 which is rigid is sealed at end 12 and has perforations 14 adjacent each end communicating with the interior. A tough resilient sheath 16 of expandable material such as neoprene with an enlargement 16A at one end and a central corrugated region 18 extends around and encloses all portions of the tube except end 12.

End 12 extends into a tank 20 containing compressed air, carbon dioxide or other gas and the open end of the sheath is sealed into a suitable compartment 22 of the tank which is adjacent end 12.

The tank carries an axially extending needle 24 having a threaded region 26 engaging an internal thread in axial sleeve 28 fixed in the tank by sealing disc 30. The end of the needle opposite the point extends out of the tank and is secured to a ratchet plate 32. Rotation of the plate enables the needle to be rotated by wing nut 15 to rupture end 12 whereby the sheath is inflated.

In use, prior to inflation the sheath and rod are extended through the hole until corrugations 18 engage the hole. The sheath is then inflated producing enlargements 34 on each side of the hole which act as a temporary seal and enables the ship to stay afloat pending arrival of more sophisticated rescue apparatus.

In the modification of FIGS. 4 and 5, an expansion coil spring 26 disposed about the needle is normally compressed between disc 30 and a washer 50 on the needle. The end 52 of the needle which extends out of the tank is held outside by keeper 54. When the keeper is manually swung out of the way, the spring expands, pushing the needle forward to rupture the tube and inflate the sheath as described.

While I have described my invention with particular reference to the drawings, such is not to be considered as limiting its actual scope.

Having thus described this invention, what is asserted as new is:

1. An emergency plug comprising:
   an elongated hollow tube sealed at one end, open at the other end and having perforations adjacent each end communicating with the interior;
   a pressurized tank enclosing the sealed end of the tube;
   an expandable sheath enclosing the tube and sealed to said tank; and
   manually operable means disposed partially outside the tank and partially inside the tank to rupture the closed end of the tube and cause the sheath to inflate.

2. The plug of claim 1 wherein said sheath has a corrugated region adjacent the center of the rod.

3. The plug of claim 2 wherein said means includes a pointed needle which is advanced to penetrate said closed end of the tube.

4. The plug of claim 3 wherein the needle is advanced by rotating it.

5. The plug of claim 3 wherein the needle is advanced by use of an expanding spring.

* * * * *